J. O. Lewis.
Card-Grinding Cylinder.
No 72509.  Patented Dec. 24, 1867.
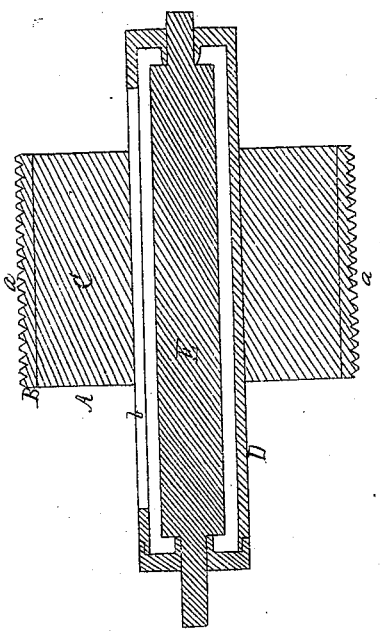
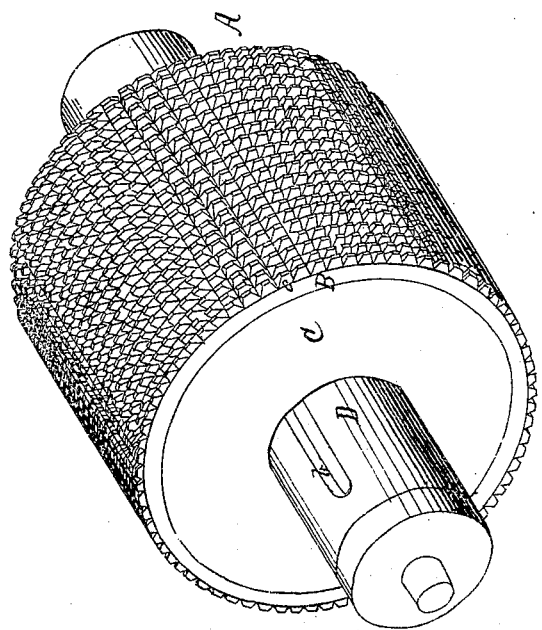
Witnesses
Thos H. Dodge
D. L. Miller
Inventor:
J. O. Lewis

United States Patent Office.

J. O. LEWIS, OF WORCESTER, MASSACHUSETTS.

Letters Patent No. 72,509, dated December 24, 1867.

IMPROVED CARD-GRINDING CYLINDER.

*The Schedule referred to in these Letters Patent and making part of the same.*

KNOW ALL MEN BY THESE PRESENTS:

That I, J. O. LEWIS, of the city and county of Worcester, and Commonwealth of Massachusetts, have invented certain new and useful Improvements in Score and Spur-Grinders for Grinding Card-Teeth; and I do hereby declare that the following is a full, clear, and exact description of the same, reference being had to the accompanying drawings, forming a part of this specification, in which—

Figure 1 represents a perspective view of my improved grinder, and

Figure 2 represents a longitudinal central section of the same.

To enable those skilled in the art to which my invention belongs to make and use the same, I will proceed to describe it more in detail.

In the drawings, A represents the grinding-cylinder or wheel, which has heretofore been made smooth on its outer surface, and then covered with a coating of emery. As thus made, it has been objectionable in that some of the particles of emery would project out further than the rest, and thus cause unequal grinding of the card-teeth, and, in some cases, cause injury to the teeth.

To obviate the above and other objections, I make the outer ring or rim B of the grinder A of wrought or malleable metal, and then cut out the surface, so as to form even teeth or projections a, after which the teeth or projections a are properly tempered or case-hardened. Rim B is then properly fitted to the metal core C, or other core of suitable form, and the card-grinder thus made can then be operated in any ordinary or suitable manner, and by any of the well-known means now in use.

My invention has been tested, and has been found to work well, and the results are surprising to all who have witnessed its operation. If preferred, a coating of emery may be applied to the teeth a.

Having described my improved grinder for grinding card-teeth, what I claim therein as new and of my invention, is—

Making the rim or metal part B with a series of teeth a, substantially as shown and described.

J. O. LEWIS.

Witnesses:
  THOS. H. DODGE,
  D. L. MILLER.